United States Patent [19]
Snyder et al.

[11] Patent Number: 6,043,626
[45] Date of Patent: Mar. 28, 2000

[54] AUXILIARY BATTERY HOLDER WITH MULTICHARGER FUNCTIONALITY

[75] Inventors: Thomas D. Snyder, Raleigh; Timothy Banyas, Apex, both of N.C.

[73] Assignee: Ericsson Inc., Research Triangle Park, N.C.

[21] Appl. No.: 08/904,739

[22] Filed: Aug. 1, 1997

Related U.S. Application Data

[63] Continuation-in-part of application No. 08/738,780, Oct. 29, 1996, Pat. No. 5,859,481, and a continuation-in-part of application No. 08/739,684, Oct. 29, 1996, abandoned.

[51] Int. Cl.⁷ .............................. H02J 7/00; H04M 1/00
[52] U.S. Cl. .................... 320/113; 320/114; 320/107; 340/1; 379/441; 379/442; 379/455
[58] Field of Search .................. 320/107, 113, 320/114; 340/1; 379/441, 442, 454, 455, 457

[56] References Cited

U.S. PATENT DOCUMENTS

| | | | |
|---|---|---|---|
| 4,320,767 | 3/1982 | Villa-Real | 600/493 |
| 4,662,507 | 11/1986 | Persen | 320/111 |
| 4,709,202 | 11/1987 | Koenck et al. | 320/43 |
| 5,059,885 | 10/1991 | Weiss et al. | 320/115 |
| 5,146,149 | 9/1992 | Nilssen | 320/112 |
| 5,182,509 | 1/1993 | Simmonds | 320/131 |
| 5,485,073 | 6/1996 | Kasashima et al. | 320/106 |
| 5,487,099 | 6/1996 | Maekawa | 379/59 |
| 5,490,202 | 2/1996 | Maekawa | 379/58 |
| 5,525,888 | 6/1996 | Toya | 320/111 |
| 5,572,110 | 11/1996 | Dunstan | 320/106 |
| 5,610,497 | 3/1997 | Croughwell | 307/70 |
| 5,614,806 | 3/1997 | Wilson et al. | 320/160 |
| 5,717,307 | 2/1998 | Barket et al. | 340/636 |
| 5,768,371 | 6/1998 | Snyder | 379/446 |
| 5,783,927 | 6/1998 | Chen | 320/110 |

FOREIGN PATENT DOCUMENTS

| | | |
|---|---|---|
| 0608899 | 8/1994 | European Pat. Off. . |
| 10-243074 | 9/1998 | Japan . |
| WO92 08293 | 5/1992 | WIPO . |

*Primary Examiner*—Shawn Riley
*Assistant Examiner*—Gregory J. Toatley, Jr.
*Attorney, Agent, or Firm*—Burns, Doane, Swecker & Mathis, L.L.P.

[57] ABSTRACT

A portable electronic device holder having a housing defining a cradle for holding an electronic device, a battery integrally connected with the housing for powering the electronic device in response to placement of the electronic device within the cradle of the housing, and a connection for interconnecting power circuitry of the electronic device with the battery. The housing further includes a charger for charging the battery incorporated therewithin. The holder may also include an attachment for attaching the housing to a user, such as, for example, a belt clip.

12 Claims, 7 Drawing Sheets

6,043,626

AUXILIARY BATTERY HOLDER WITH MULTICHARGER FUNCTIONALITY

CROSS-REFERENCE TO RELATED APPLICATIONS

This is a continuation-in-part of U.S. application Ser. No. 08/738,780, filed Oct. 29, 1996 now U.S. Pat. No. 5,859, 481, and U.S. application Ser. No. 08/739,684, filed Oct. 29, 1996, abandoned, the entire contents of both hereby being incorporated by reference.

TECHNICAL FIELD

The present invention relates generally to a method and apparatus for extending the battery life of portable cellular telephone units, and more particularly, to battery charging techniques for charging main and auxiliary batteries within a holder for a cellular telephone unit.

BACKGROUND OF THE INVENTION

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing needs as well as to maintain high quality service and avoid rising prices.

One of the greatest challenges associated with the continuing development of portable cellular telephone units used in radiocommunication systems involves providing an adequate portable power supply which is as small as possible. A battery pack is typically the main power source for these, and other, portable electronic devices, e.g., cellular phones and portable computers. The portable nature of cellular phones is limited by the fact that their battery power will not last forever. After a period of time the batteries become discharged and the cellular phone must be plugged into a charger in order to recharge the battery. In order to achieve more battery power (longer battery life), typically the size of the battery cell must be increased. This presents a problem for cellular telephone designers due to the conflicts between a desire for longer talk time and standby for the phone (i.e., longer battery life) and the desire for smaller, lighter telephones.

Existing solutions for the problems of shortened talk time and standby have been limited to the development of high capacity batteries for cellular telephone units. These batteries suffer from the limitations of size and weight mentioned previously. The conflict between size and power is made worse by the development of next generation telephones which are becoming smaller and smaller. Other solutions involve the use of improved battery technologies that increase the charge per volume and charge per weight ratios of existing battery systems. However, these improvements have not been sufficient to keep up with the smaller sizes of cellular telephone units that are possible using existing components and technologies. Thus, in order to increase a cellular telephone's battery life while at the same time leaving the size and weight of the cellular telephone unchanged, recent improvements include incorporating an auxiliary battery within a belt holder for a cellular telephone unit. Even in this instance though, a separate multi-battery charger must be supplied in order to charge the auxiliary battery as well as the internal battery of the cellular telephone unit. The size and weight of the typical multi-battery charger, however, is not suitable for travel nor does it meet the portability requirements of today's on-the-move cellular telephone user.

SUMMARY OF THE INVENTION

These, and other, problems, drawbacks and limitations of conventional mechanisms and techniques for charging batteries in cellular telephones and other electronic devices are overcome according to the present invention, wherein techniques are provided to incorporate a battery charger within the housing of the electronic device.

More particularly, the present invention provides a portable electronic device holder having a housing defining a cradle for holding an electronic device, a battery integrally connected with the housing for powering the electronic device in response to placement of the electronic device within the cradle of the housing, and a connecting mechanism for connecting the power circuitry of the electronic device with the integral battery. The housing also includes a battery charger for charging the battery incorporated within the housing.

BRIEF DESCRIPTION OF THE DRAWINGS

These, and other, objects, features and advantages of the present invention will become more readily apparent to those skilled in the art upon reading the following detailed description, in conjunction with the appended drawings, in which.

DETAILED DESCRIPTION OF THE INVENTION

Those skilled in the art will readily appreciate that the present invention is applicable to any and all devices which use batteries that are rechargeable, including, for example, cellular telephones and portable computers. However, for the purposes of illustration, rather than limitation, the following discussion provides examples which illustrate application of the present invention in the area of portable cellular telephones. Accordingly, prior to describing battery charging techniques according to the present invention, a brief description of a portable cellular telephone incorporating an auxiliary battery within a belt holder is provided below for context.

Figure 1:
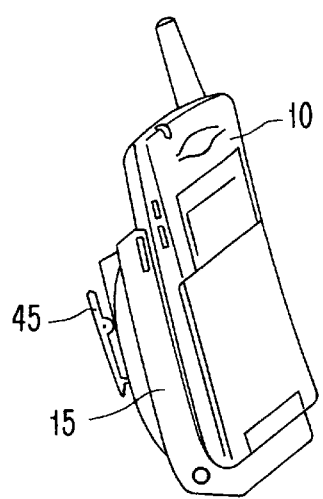
FIG. 1 is a perspective view of a portable cellular telephone and holder according to one embodiment of the present invention.
Figure 2:
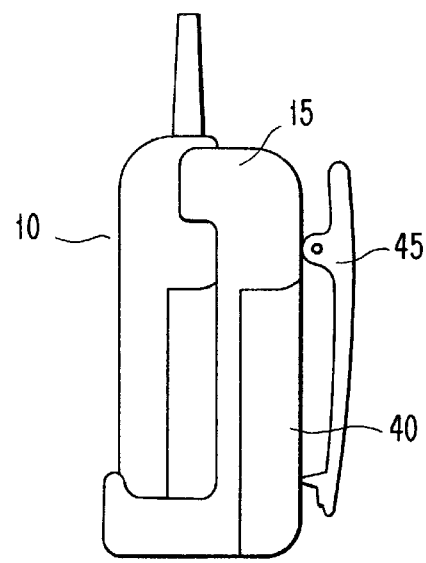
FIG. 2 is a schematic side elevational view of a portable cellular telephone and holder according to one embodiment of the present invention.
Figure 3:
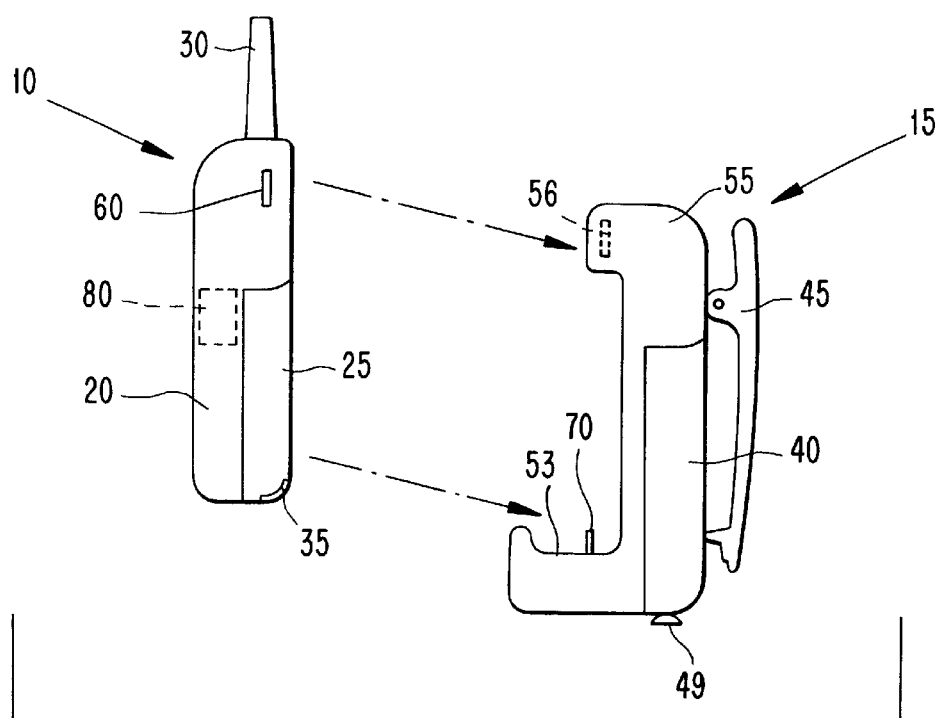
FIG. 3 is an exploded view thereof showing the telephone removed from the holder.

Referring to FIGS. 1–3, there is illustrated a cellular telephone holder 15 incorporating an auxiliary battery 40 and an associated cellular telephone unit 10. The cellular telephone unit 10 includes the main housing 20, a battery 25 and an antenna 30. Contact 35 at the base of the cellular telephone provides a connection to the power circuitry of the cellular telephone unit 10. The circuitry interconnected with the contact 35 will be more fully discussed below. While the present description illustrates the contact being placed at the base of the cellular telephone unit 10, the contact may of course be located at any point enabling interconnection of the cellular telephone unit 10 with the auxiliary battery 40 of the telephone holder 15.

The cellular telephone holder 15 includes the auxiliary battery 40 integrally connected with a housing 55. The holder housing 55 is designed such that it is integrated with auxiliary battery 40 as a single piece or such that the auxiliary battery may be removably connected to the holder housing by sliding, snapping or some other type of connection as known in the art.

The housing 55 defines a cradle 53 for holding the cellular telephone unit 10. A holding rib 56 in the housing 55 may be positioned to lockably engage a corresponding slot 60 within the housing 20 of the cellular telephone unit 10. The rib 56 and slot 60 combination secure the telephone unit 10 within the cradle 53 while still enabling removal of the telephone unit from the telephone holder 15. A clip 45 for enabling a user to attach the cellular telephone holder 15 to some portion of their clothing, most likely their belt, is connected to the back of the holder housing 55. This enables the weight of the auxiliary battery 40 to be more conveniently carried in a place other than the telephone unit 10.

The cradle 53 for the cellular telephone unit 10 further includes a contact 70 for engaging the contact 35 of the portable telephone unit 10. The contact 70 interconnects the positive and negative terminals of the auxiliary battery 40 to the portable telephone unit 10. Internal to the telephone 10 is auxiliary battery sensor circuitry 80 for switching system power between the main battery 25 and the auxiliary battery 40 (see FIG. 4) and battery charging circuitry 450 (see FIG. 9) for recharging the main battery 25 and the auxiliary battery 40. Switching between the batteries is responsive to changes in current initiated by placement or removal of the telephone unit 10 from the housing 55. The sensor circuitry 80 also switches power back to the main battery 25 should the charge of the auxiliary battery 40 become depleted. The preferred embodiment of the sensor circuitry 80 will be more fully discussed with respect to FIGS. 4–6.

Figure 7:
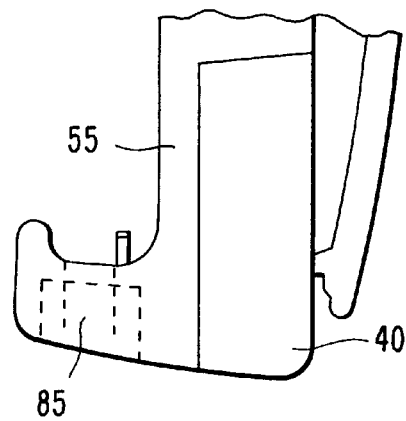
FIG. 7 is a partial side elevation of an alternative embodiment of a portable cellular telephone unit according to the present invention.

Referring to FIG. 7 there is illustrated a side view of an alternative embodiment of the cellular telephone holder 55 wherein there is included within the cradle, an opening 85 enabling attachment of peripheral devices to the telephone unit 10. Through this opening 85 data accessories, chargers, and/or alternative telephone connections may be connected to the telephone unit 10.

It should be realized that while FIGS. 1–3 have been described with respect to the use of a cellular telephone and cellular telephone holder, the use of the electronic holding device having an integrated battery charging device would be equally applicable to any electronic device having an internal battery.

Figure 4:
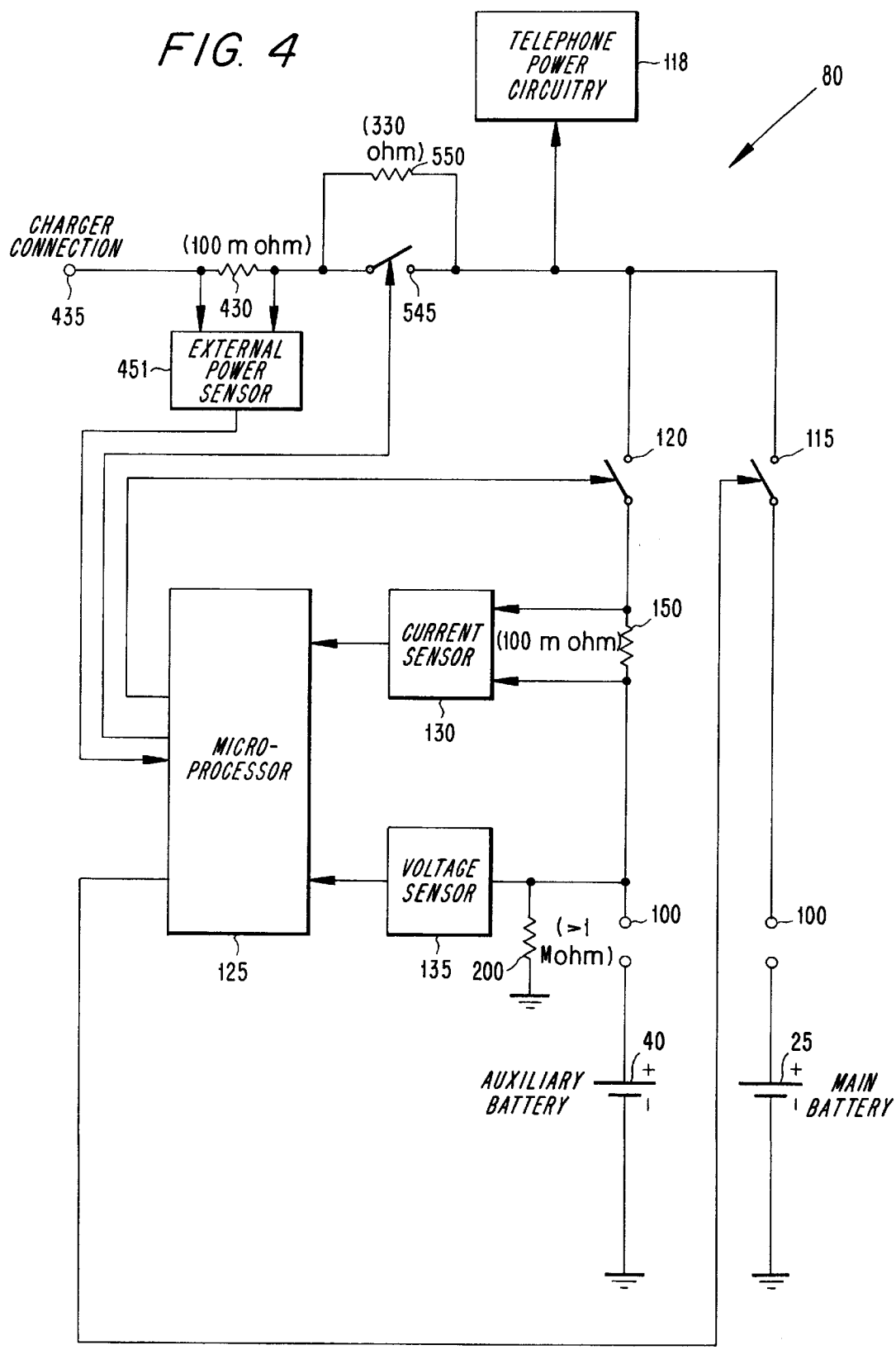
FIG. 4 is a block diagram illustrating the circuitry for switching battery power between the auxiliary battery and the main battery when a cellular telephone is placed in the telephone holder and no external power is detected.

Referring to FIG. 4, there is illustrated the auxiliary battery sensor circuitry 80 for detecting the connection of an auxiliary battery 40 to the cellular telephone 10 and the detection of an external power source at charge connection 435 for recharging either the main or auxiliary battery. The sensor circuitry 80 includes a pair of connections 100 for interconnecting the main battery 25 and the auxiliary battery 40 to the power circuitry of the telephone unit 10. A pair of switches 115 and 120 interconnect the main battery 25 and auxiliary battery 40 to the remainder of the telephone power circuitry 118. The switches 120 and 115 are controlled by a microprocessor 125 in response to control signals received from a current sensor 130, a voltage sensor 135, and an external power sensor 451. The sensor circuitry 80 also includes a parallel trickle connection switch 545 and a resistor 550, which will allow the phone to be charged even in the event that the voltage of the main battery falls below a predetermined value of the voltage regulator (not shown).

When the external power sensor 451 does not detect current passing through resistor 430, the battery sensor circuitry 80 will control the source of power supplied to power circuitry 118. In this mode of operation, the current sensor 130 detects current passing through a resistor 150. Current flow through the resistor 150 is initiated by connection of the auxiliary battery 40 to the portable telephone unit 10.

Figure 5:
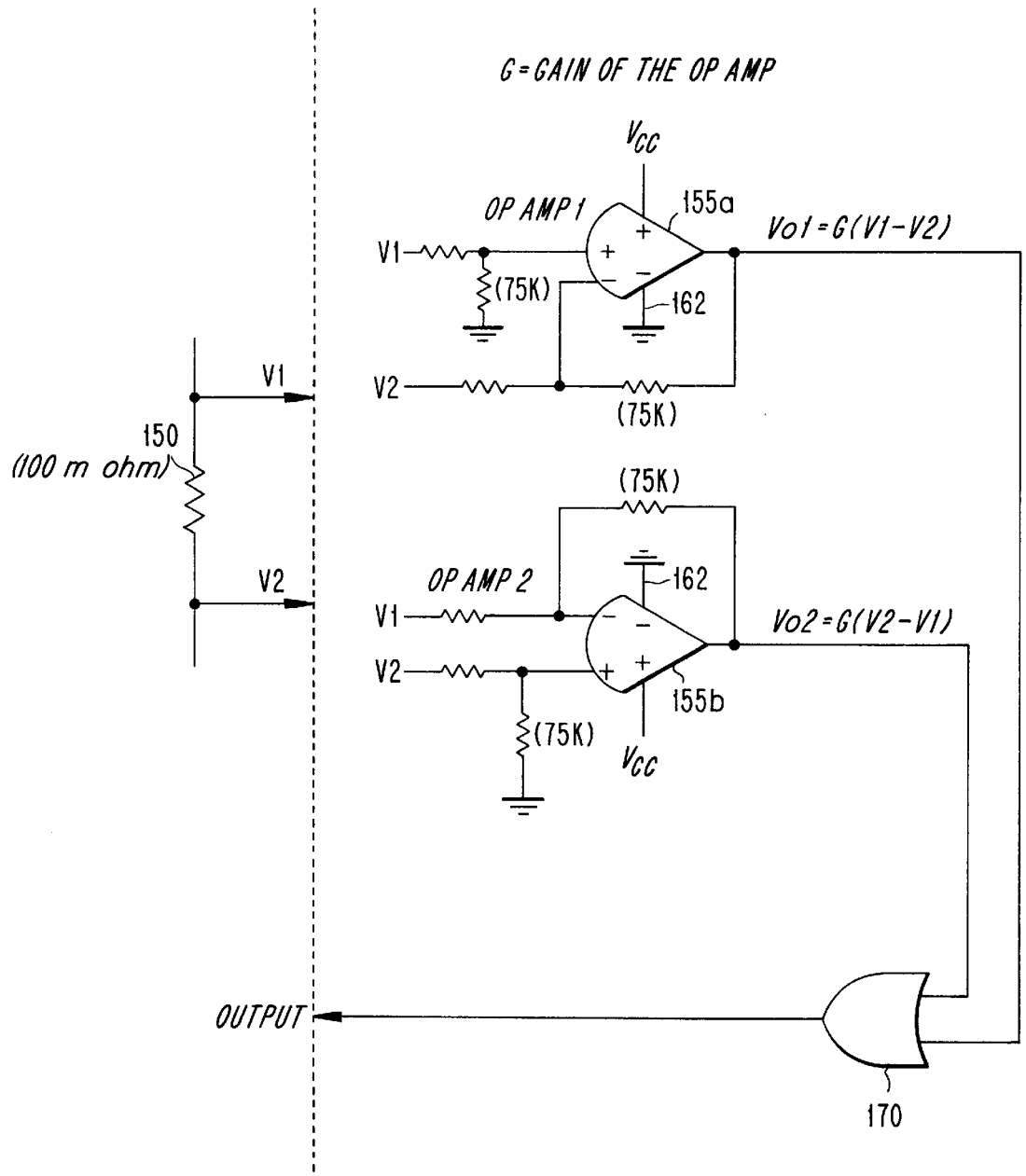
FIG. 5 is a circuit diagram of the current sensor block of FIG. 4.

Referring also to FIG. 5, the circuitry of the current sensor 130 is illustrated. Voltage readings (V1 and V2) are taken from each end of the resistor 150 and applied to the inputs of a pair of operational amplifiers 155a, 155b. The voltage V1 is connected to the positive input of operational amplifier 155a while voltage V2 is connected to the negative input. The inputs of the operational amplifier 155b are connected to the voltages in the opposite manner. The operational amplifiers 155a, 155b amplify the difference in voltage across the resistor 150. Since a negative supply voltage is not available within the portable telephone unit 10, each operational amplifier 155a, 155b has its negative supply 162 grounded and cannot supply a negative voltage. Consequently, two operational amplifiers 155a, 155b are needed to amplify the differential voltage for each direction of current flow.

The voltage differential output of each operational amplifier 155a, 155b is provided to the inputs of an OR gate 170. If either the first or second operational amplifier 155a, 155b generates a voltage greater than a predetermined magnitude, indicating current is flowing through the sensor resistor 150, the OR gate 170 outputs a logical high voltage signal. This is interpreted by the microprocessor 125 as connection of an auxiliary battery and switch 120 is consequently closed while switch 115 is opened to preserve power to the main battery 25. When the outputs of both the first and second operational amplifiers 155a, 155b are low, OR gate 170 generates a logical low voltage signal, and switch 115 is consequently closed by the microprocessor to provide power from the main battery 25. Switch 120 also remains closed to enable current flow to occur through resistor 150 once an auxiliary battery 40 is connected.

As shown FIG. 4, the voltage sensor 135 determines the voltage output of a connected auxiliary battery 40 and generates a voltage signal indicating whether sufficient voltage exists to power the cellular telephone unit 10. Sufficient voltage is based upon whether the auxiliary battery 40 can supply a pre-selected threshold voltage. When the auxiliary battery voltage falls below the predetermined threshold, a signal is generated indicating this to the microprocessor 125. The microprocessor then opens switch 120 to disconnect the auxiliary battery 40 from the power circuitry 118, and switch 115 is closed to connect the main battery 25. With switch 120 open, however, resistor 150 can no longer detect the disconnection of the auxiliary battery 40. Therefore, a resistor 200 enables detection of a physical connection of the auxiliary battery 40 to connector 100. When the auxiliary battery 40 engages connector 100, the voltage across resistor 200 will be positive. Once the auxiliary battery 40 is disconnected, the voltage across the resistor 200 goes to approximately zero. The voltage across the resistor 200 is monitored by the voltage sensor 135.

Figure 6:
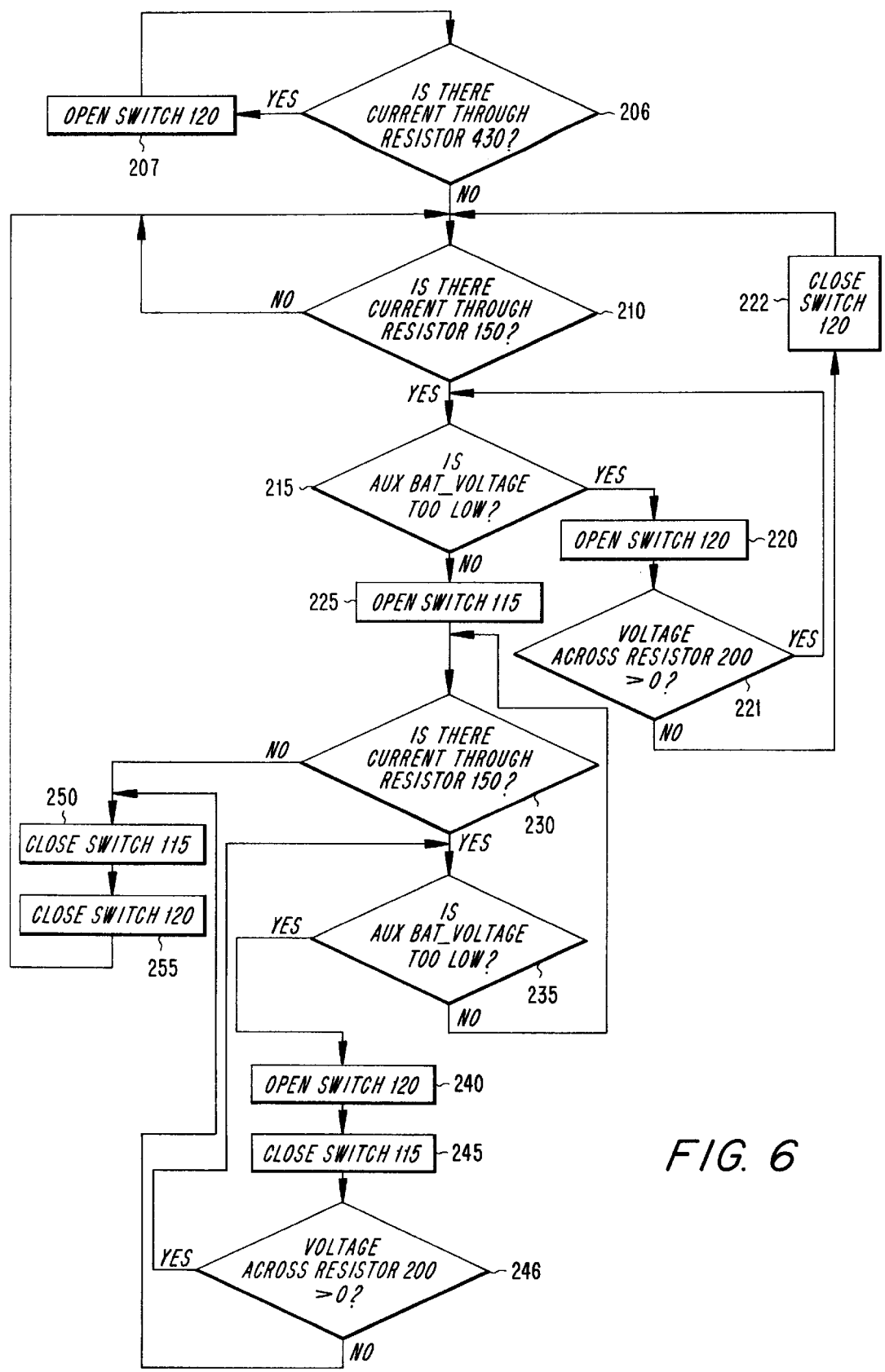
FIG. 6 is a block diagram illustrating the control flow of the microprocessor of FIG. 4.

A flow diagram describing the algorithm for controlling switches 115 and 120 by the microprocessor 125 is illustrated in FIG. 6. This algorithm outlines the decision processes followed by the microprocessor 125. Initially, both switches 115 and 120 are closed. Inquiry step 206 determines whether an external power source 425 has been connected to charge the main battery 25 by measuring current through resistor 430. If an external power connection is detected, switch 120 is opened at step 207 and control will pass to the battery changing circuitry 450 shown in FIG. 9. If no external power source is detected, then inquiry step 210 determines whether an auxiliary battery 40 has been connected to the cellular telephone unit 10 by measuring current through resistor 150. The microprocessor 125 continues to monitor for connection of the auxiliary battery 40 at step 210 until a connection is detected. Once an auxiliary battery 40 connection is detected, inquiry step 215 determines if the auxiliary battery voltage is too low. When the voltage level is too low, switch 120 is opened at step 220. Inquiry step 221 determines whether the voltage across resistor 200 is greater than zero. As mentioned previously, a voltage across resistor 200 of greater than zero indicates that the auxiliary battery remains connected. If the auxiliary battery 40 is connected, control passes back to step 215 to determine whether or not the battery voltage is too low. If the auxiliary battery 40 is disconnected, switch 120 is closed at step 222 and control passes back to step 210 to monitor for a re-connection of the auxiliary battery.

If sufficient voltage exists within the auxiliary battery 40, switch 115 is opened at step 225. Inquiry step 230 determines whether the auxiliary battery 40 is still connected by sensing current through resistor 150. If the auxiliary battery 40 remains connected, inquiry step 235 determines if sufficient auxiliary battery voltage still remains. As long as the auxiliary battery 40 remains connected and provides sufficient voltage, control continues to loop through inquiry steps 230 and 235 to monitor for auxiliary battery 40 disconnection and low voltages. Should the voltage within the auxiliary battery 40 drop below acceptable levels, switch 120 is opened at step 240 while switch 115 is closed at step 245 to connect the telephone unit 10 to the main battery 25.

Once the main battery 25 has been reconnected, inquiry step 246 determines whether the auxiliary battery 40 is still connected by determining whether the voltage across resistor 200 is greater than zero. If so, control passes back to step 235 to determine whether or not the auxiliary battery voltage is still too low. Once the auxiliary battery 40 is disconnected, switch 115 is closed at step 250 while switch 120 is closed at step 255. This passes control of system power to the main battery 25 and control returns back to step 210 to wait for reconnection of the auxiliary battery 40.

Using the circuitry and algorithm described above, with no external power supplied, the apparatus will operate in the following manner. In normal operation, the auxiliary battery 40 is not connected, and the power source for the telephone unit 10 is the main battery 25. Switch 115 is closed so that the phone draws current from the main battery 25. Switch 120 also remains closed to enable detection of the connection of an auxiliary battery 40. When a user connects the auxiliary battery 40, current passes through the sensor resistor 150 and voltage across resistor 200 becomes greater than zero. This current flow is detected by the current sensor 130 and a current signal notifying the microprocessor 125 is generated.

The voltage sensor 135 and microprocessor 125 then determine if sufficient voltage exists to operate the phone unit 10. If the voltage of the auxiliary battery 40 is too low, the microprocessor 125 keeps switch 115 closed and opens switch 120. This prevents the auxiliary battery 40 from draining current from the main battery 25. If the voltage is sufficient, the microprocessor 125 opens switch 115 in order to prevent further current drain from the main battery 25.

Switch 115 remains opened and switch 120 closed until such time as the voltage of the auxiliary battery 40 drops below the preselected threshold level, or the telephone unit 10 is disconnected from the auxiliary battery. In either case, switch 115 is closed so that the telephone unit 10 is now powered by the main battery 25. If switch 115 is closed due to low voltage level, switch 120 is opened for the reasons discussed above. If the auxiliary battery 40 has been disconnected as indicated by the voltage across resistor 200, switch 120 remains closed to enable detection of current flow to the sensor resistor 150.

Figure 8:
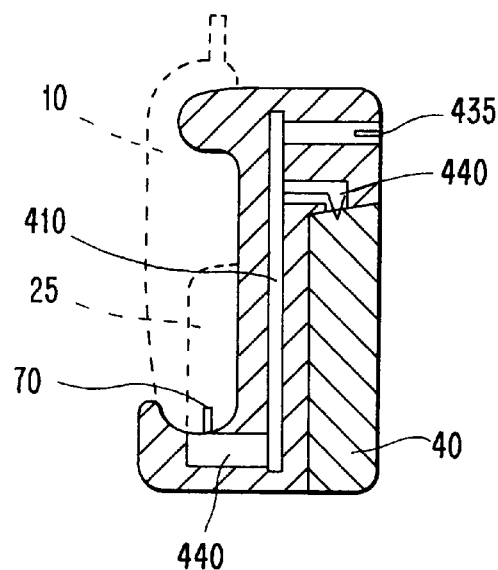
FIG. 8 is a sectional view of the holder for the cellular telephone unit shown in FIG. 2.
Figure 9:
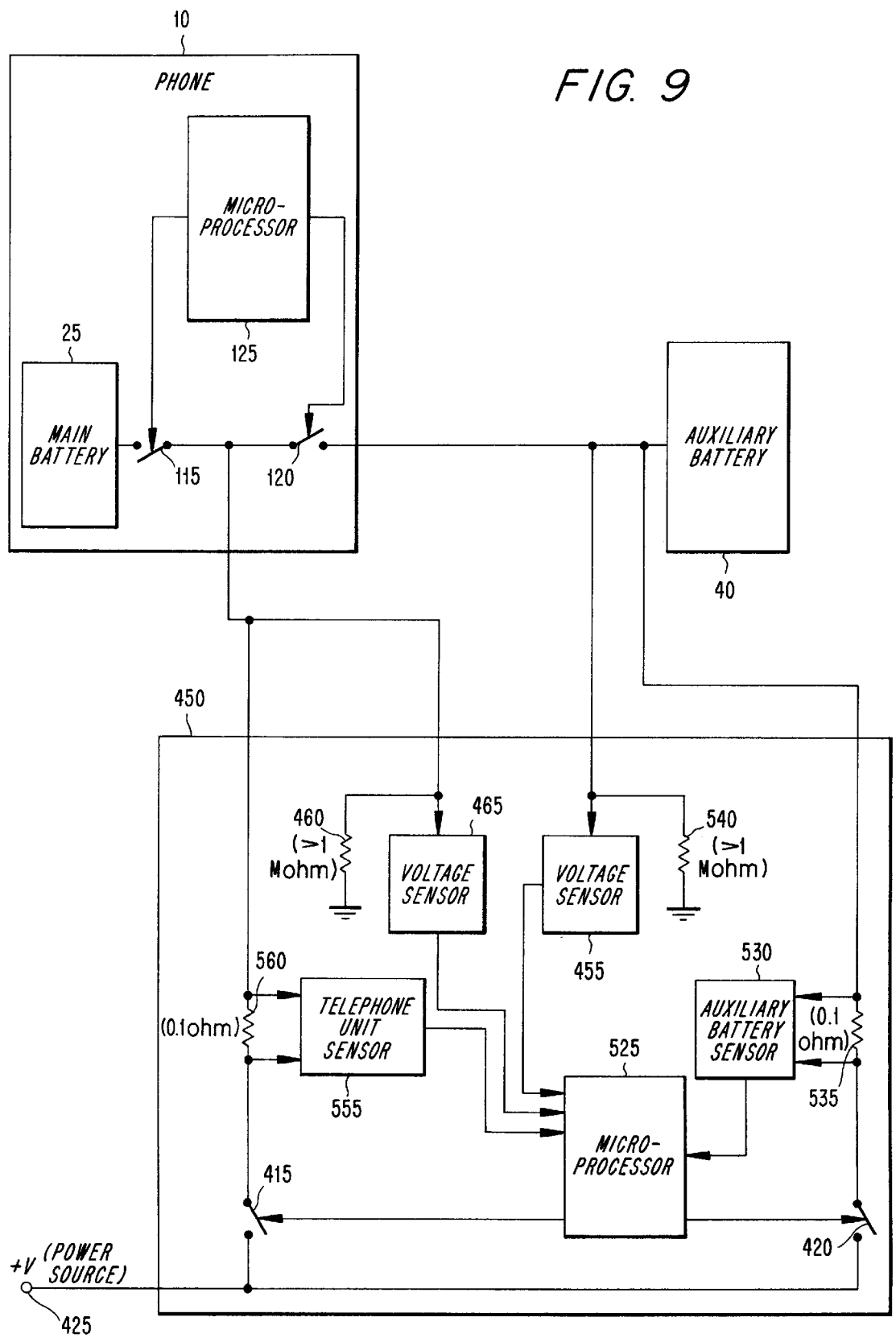
FIG. 9 is a block diagram illustrating the circuitry for switching charging power between the auxiliary battery and the main battery when a cellular telephone is placed in the telephone holder and external power is supplied.
Figure 10:
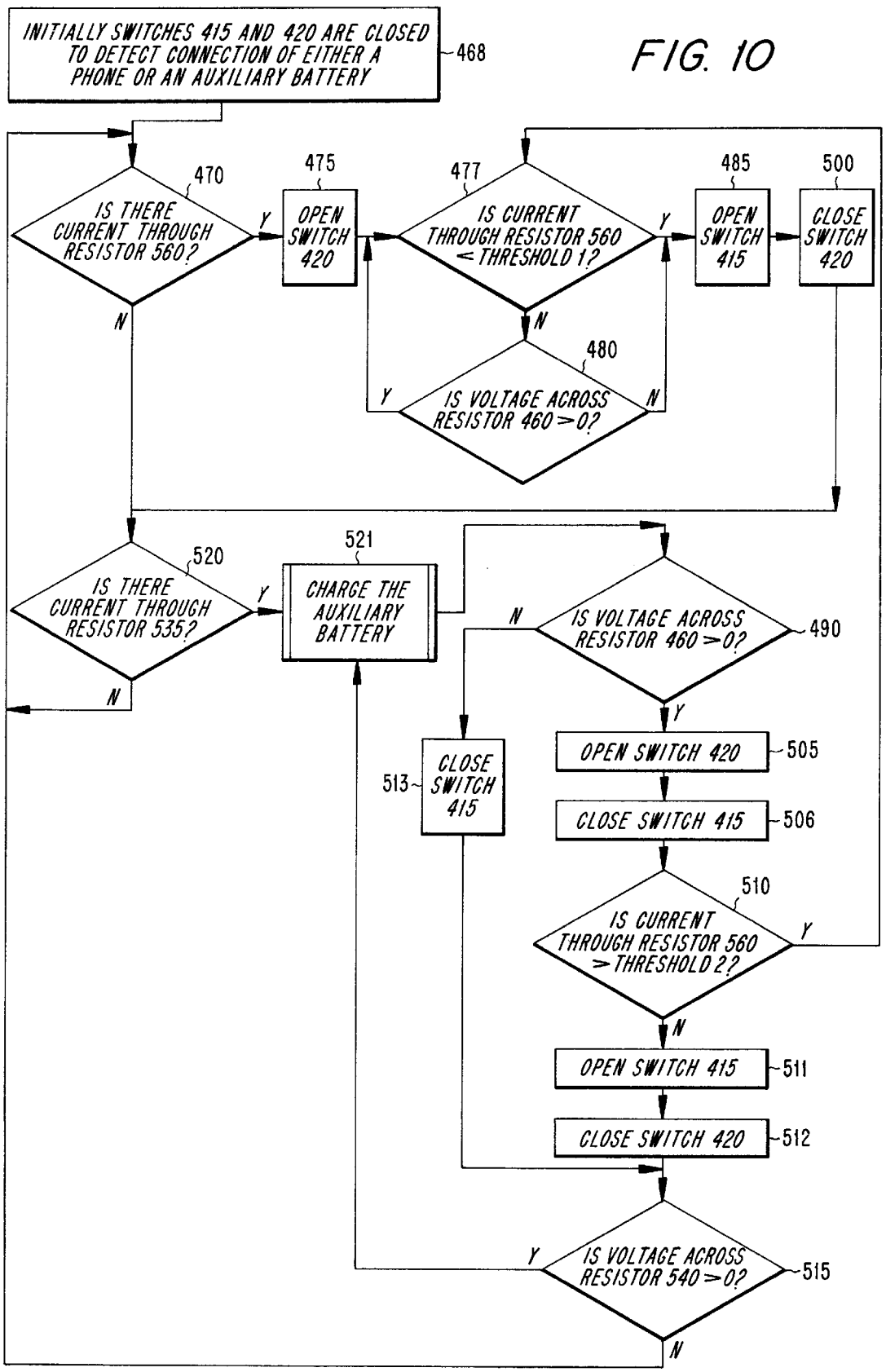
FIG. 10 is a block diagram illustrating the control flow of the microprocessor of FIG. 9.

Referring also to FIGS. 8–10, the cellular telephone holder 15 also includes an integrated battery charger 410 having associated battery charging circuitry 450. The battery charger 410 includes battery charging circuitry 450 having a telephone unit sensor 555 for detecting the connection of the telephone unit 10, an auxiliary battery sensor 530 for detecting the connection of the auxiliary battery, and a pair of connections 440 for connecting the external power source 425 applied to battery charger 410 to the power circuitry of the telephone unit 10 and the auxiliary battery 40. Battery charger 410 also includes a pair of switches 415, 420 which open and close to charge the main battery 25 or the auxiliary battery 40 when an external power source is present and interconnect the external power source to the remainder of the telephone power circuitry 118. The switches 415, 420 are controlled by a microprocessor 525 in response to control signals received from auxiliary battery sensor 530 which detects the connection of the auxiliary battery 40, and telephone unit sensor 555 which detects the connection of the telephone unit 10 within the holder 15. Battery charger 410 is preferably a printed circuit board containing the necessary common components of a multicharger that is inserted within housing 15, as shown in FIG. 8.

Telephone unit sensor or current sensor 555 detects current passing through a resistor 560. Current flow through the resistor 560 is initiated by connection of the portable telephone unit 10 to the holder 15. When the contact 35 of the portable telephone unit 10 engages the contact 70 of the holder 15, the current across resistor 560 will be positive. Once the portable telephone unit 10 is removed from the holder 15, the current across resistor 560 goes to zero. The current across resistor 560 is monitored by current sensor 555 which generates a signal indicating to the microprocessor whether or not there is current flow.

When an external power source 425 is connected at connection 435, battery charging circuitry 450 controls the charging and maintenance of main battery 25 and auxiliary battery 40 through the opening and closing of switches 415 and 420. When microprocessor 125 interprets that an external power source 425 is detected by external power sensor 451 and microprocessor 525 interprets that an auxiliary battery 40 is detected by current flow through resistor 535 and telephone unit 10 is detected by current flow through resistor 560, switch 120 is opened by microprocessor to disconnect the auxiliary battery 40 from the power circuitry 118 since the portable telephone unit 10 can be powered from the external power source 425 and the power of the auxiliary battery 40 can be preserved. Microprocessor 525 also opens switch 420 and maintains switch 415 in a closed position to allow main battery 25 to be charged by battery charger 410, until the current flow through resister 560 reaches a predetermined threshold value. In the process of charging main battery 25, microprocessor 525 will also open switch 415 and close switch 420 to allow the auxiliary battery 40 to be charged, as described below.

When auxiliary battery 40 is disconnected, the voltage across resistor 540 will go to zero and voltage sensor 455 will generate a signal indicating this to the microprocessor 525. When microprocessor 525 interprets that the external power source 425 is detected and the telephone unit 10 is detected, but that auxiliary battery 40 is disconnected, switch 420 is opened to disconnect the auxiliary battery 40 from the battery charger 410. Switches 115 and 415 will remain closed to allow main battery 25 to be charged by battery charger 410.

Alternatively, when telephone unit 10 is removed from holder 15, the voltage across resistor 460 will go to zero and voltage sensor 465 will generate a signal indicating this to the microprocessor 525. When microprocessor 525 interprets that the auxiliary battery 40 is detected by resistor 535, but that the telephone unit 10 is disconnected, switch 420 remains closed to allow auxiliary battery 40 to be charged by battery charger 410. Microprocessor 525 may also open switch 415 since there is no telephone unit 10, and thus no main battery 25, within the holder.

In each of the above described modes of operation, telephone unit 10 is fully operational to make and receive telephone calls. Thus, telephone unit 10 may be used while it is being charged by battery charger 410. Holder 15 is small and versatile such that it may be easily and comfortably be attached to the user through the use of belt clip 45. When not attached to the user, however, housing 15 can sit level on a table and be connected to an external power supply much in the way of a conventional battery charger. In this instance, though, the battery charger is already incorporated into the portable telephone housing and a separate unit is not needed.

Referring now to FIG. 10 there is illustrated a flow diagram describing the algorithm for controlling switches 415 and 420 by the microprocessor 525. This algorithm outlines the decision processes followed by the microprocessor 525 once it is determined that an external power supply is connected. If no external power supply is detected, the algorithm shown in FIG. 6 will control the opening of switches 115, 120, while switches 415, 420 remain closed to detect the connection of either the telephone unit 10 or the auxiliary battery 40. Thus, initially, switches 415, 420 are closed, as shown in step 468. Inquiry step 470 determines whether the cellular telephone unit 10 is connected by determining whether there is current across resistor 560. If no current is detected, inquiry step 520 next determines whether the auxiliary battery 40 is connected by determining whether there is current across resistor 535. The microprocessor 525 continues to monitor for connection of the telephone unit 10 at step 470 and the auxiliary battery at step 520 until a connection is detected.

When the telephone unit 10 is detected, switch 420 is opened at step 475 such that the main battery 25 of the telephone unit may be charged if needed without draining power from the auxiliary battery 40.

Inquiry step 477 determines whether the current through resistor 560 is less than a first predetermined threshold value, as determined by current sensor 555, thereby indicating the need to charge the main battery 25. If main battery 25 is not in need of charging, inquiry step 480 determines whether the voltage across resistor 460 is greater than zero. As mentioned previously, a voltage across resistor 460 of greater than zero indicates that the main battery is still connected. As long as the main battery 25 remains connected and provides sufficient current, control continues to loop through inquiry steps 477 and 480 to monitor for main battery 25 disconnection and low current. If, at inquiry step 480, the voltage determined by voltage sensor 465 is zero, thus indicating that main battery 25 has been disconnected or removed from the holder, switch 415 is opened at step 485 since there is no main battery 25 to be charged by the battery charger 410 and switch 420 is closed at step 500 to allow the battery charger to detect the connection of the auxiliary battery by current flow through resistor 535.

Inquiry step 520 then determines whether the auxiliary battery 40 is connected by determining whether there is current across resistor 535. If no current is detected, the microprocessor 525 continues to monitor for connection of the telephone unit 10 at step 470 and the auxiliary battery at step 520 until a connection is detected. On the other hand, if the current sensor 530 determines that there is current flow through resistor 535 at inquiry step 520, thus indicating that auxiliary battery 40 is connected, switch 420 remains closed, switch 415 remains open, and the auxiliary battery 40 is charged by the battery charger 410 at step 521.

After charging of the auxiliary battery 40, inquiry step 490 determines whether potable telephone unit 10 is connected to the housing 15. As described above, when the contact 35 of the portable telephone unit 10 engages the contact 70 of the holder 15, the voltage across resistor 460 will be greater than zero. Thus, if the voltage determined by voltage sensor 465 is greater than zero, thus indicating that telephone unit 10 is connected, switch 415 is closed at step 506 and switch 420 is opened at step 505 to allow main battery 25 to be charged by battery charger 410 without draining auxiliary battery 40. If inquiry step 490 determines, however, that the portable telephone unit 10 is disconnected from the housing 15, such that the voltage across resistor 460 is zero, switch 415 may be closed at step 513 to allow the current sensor 555 to monitor for the connection of the telephone unit and control passes to inquiry step 515 to detect the presence of the auxiliary battery, as explained below.

While charging main battery 25, inquiry step 510 determines whether the current through resistor 560 is greater than a second predetermined threshold value, thereby indicating that main battery 25 is sufficiently charged and returning control to step 477 to monitor for low current and disconnection. If the current through resistor 560 is not greater than the second predetermined threshold value, however, switch 415 is opened at step 511 and switch 420 is closed at step 512. Inquiry step 515 determines whether the auxiliary battery 40 is still connected by sensing whether the voltage across resistor 540 is greater than zero. If voltage sensor 455 determines that the voltage is greater than zero, thereby indicating the connection of auxiliary battery 40, auxiliary battery 40 continues to be charged at step 521. If, alternatively, inquiry step 515 determines that the voltage across resistor 540 is not greater than zero, indicating that the auxiliary battery has been disconnected, control returns to inquiry step 470 to continue to monitor for the connection of the telephone unit and main battery or the auxiliary battery.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A portable electronic device holder, comprising:

a housing defining a cradle for holding an electronic device, the electronic device having a first battery;

a second battery, integrally connected with the housing, for powering the electronic device in response to placement of the electronic device within the cradle of the housing; and means for interconnecting power circuitry of the electronic device with the second battery;

wherein said housing includes means for charging the first and second batteries.

2. The holder of claim 1 further comprising means for attaching the housing to a user.

3. The holder of claim 2 wherein said means for attaching includes a belt clip.

4. The holder of claim 1 wherein the battery is insertable and removable from the housing.

5. The holder of claim 1 wherein said means for charging charges the battery in response to connection of an external power source to the means for charging.

6. The holder of claim 1 wherein the cradle accommodates a cellular telephone.

7. The holder of claim 1 wherein the housing defines an opening for attachment of peripheral devices to the electronic device.

8. An apparatus for charging a first battery in an electronic device and a second removable battery in a portable electronic device holder for holding the electronic device, comprising:

the portable electronic device holder;

first means for connecting the first battery and the second battery to a power system of the electronic device;

second means in the portable electronic device holder for connecting an external power source to the power system of the electronic device;

charging means for charging the first and second batteries from the external power source;

first means for detecting connection of the removable second battery to the power system of the electronic device and for generating a signal indicating a presence of the removable second battery;

second means for detecting connection of the external power source to the power system of the electronic device and for generating a signal indicating a presence of the external power source; and a processor, responsive to the signals generated by the first and second means for detecting, for instructing a) the second means for connecting to connect the external power source to the power system, b) the first means for connecting to disconnect the second battery from the power system, and c) the charging means to charge the first and second batteries.

9. The charging apparatus of claim 8 wherein the processor disconnects the charging means from the second battery upon indication of no presence of the removable second battery by the signal from the first detecting means.

10. A system for providing power to a power system of an electronic device comprising:

an electronic device holder including:

a housing defining a cradle for holding the electronic device;

an auxiliary battery integrally connected with the housing for powering the electronic device in response to placement of the electronic device within the cradle of the housing;

first connection means providing connection with the auxiliary battery; and second connection means providing connection with an external power supply;

said system further comprising:

a main battery for powering the electronic device;

third connection means for connecting at least one of the first connection means and the second connection means of the electronic device holder to the power system of the electronic device; and means for switching between the auxiliary battery and the external power supply responsive to connection by the third connection means.

11. The system of claim 10 wherein said second connection means includes means for charging the main battery and the auxiliary battery.

12. The system of claim 11 wherein said means for charging is integrated into the holder.

* * * * *

UNITED STATES PATENT AND TRADEMARK OFFICE
CERTIFICATE OF CORRECTION

PATENT NO.         : 6,043,626
APPLICATION NO. : 08/904739
DATED              : March 28, 2000
INVENTOR(S)        : Snyder et al.

It is certified that error appears in the above-identified patent and that said Letters Patent is hereby corrected as shown below:

On Title page
Item [63] ("Related U.S. Application Data") should read --Continuation-in-part of application No. 08/738,780, Oct. 29, 1996, Pat. No. 5,768,371, and a continuation-in-part of application No. 08/739,684, Oct. 29, 1996, Pat. No. 5,859,481.

Signed and Sealed this

Fifteenth Day of January, 2008

JON W. DUDAS
*Director of the United States Patent and Trademark Office*